United States Patent [19]

Peterson

[11] 4,353,561
[45] Oct. 12, 1982

[54] SELF-ALIGNING LATHE CHUCK JAWS

[75] Inventor: William R. Peterson, Kennewick, Wash.

[73] Assignee: The United States of America as represented by the Unites States Department of Energy, Washington, D.C.

[21] Appl. No.: 181,519

[22] Filed: Aug. 26, 1980

[51] Int. Cl.³ .................. B23B 31/12; B23B 31/16; B23B 31/18; B23B 31/19
[52] U.S. Cl. ............................ 279/123; 269/134; 279/1 L; 279/35; 279/106
[58] Field of Search .......... 279/123, 1 L, 106, 1 SJ, 279/24, 35; 269/258, 134, 135

[56] References Cited

U.S. PATENT DOCUMENTS

| | | | |
|---|---|---|---|
| 295,628 | 3/1884 | Gilmore | 279/123 |
| 1,274,685 | 8/1918 | Cline | 279/123 |
| 1,797,836 | 3/1931 | Paul | 279/106 |
| 1,799,019 | 3/1931 | Mischler | 279/123 |
| 2,523,374 | 11/1950 | Jensen | 279/123 |
| 2,811,771 | 11/1957 | Ericsson | 269/134 |
| 2,873,653 | 2/1959 | Wilson | 269/134 |
| 3,246,904 | 4/1966 | Judge | 279/123 |
| 3,248,121 | 4/1966 | Volpe | 279/123 |

FOREIGN PATENT DOCUMENTS

| | | | |
|---|---|---|---|
| 40350 | 9/1908 | Fed. Rep. of Germany | 279/123 |
| 709269 | 1/1980 | U.S.S.R. | 279/123 |

Primary Examiner—William R. Briggs
Assistant Examiner—Jerry Kearns
Attorney, Agent, or Firm—Douglas E. Erickson; Richard E. Constant; Richard G. Besha

[57] ABSTRACT

A lathe chuck jaw for a lathe chuck having a radially moving actuator which radially moves the jaw in to and out from the workpiece. A jaw base part is rigidly connected to the actuator. A jaw shoe part is rotatably attached to the base part. The shoe part has a workpiece-comforming surface which can hold the workpiece. The rotatable attachment of the shoe part allows it to match the general orientation of the workpiece, including a nonlongitudinal orientation due to a workpiece's imperfect shape.

1 Claim, 5 Drawing Figures

SELF-ALIGNING LATHE CHUCK JAWS

The United States Government has rights in this invention pursuant to Contract No. DE-AC06-77RL01030 between the U.S. Department of Energy and the Rockwell International Corporation.

BACKGROUND OF THE INVENTION

The present invention relates generally to lathe chuck jaws and more particularly to self-aligning lathe chuck jaws which better hold an imperfectly-shaped workpiece.

Lathe chucks hold a workpiece in a lathe using chuck jaws. Existing lathe chucks include a universal chuck and an independent chuck. The universal chuck usually has three jaws which are simultaneously and radially advanced to, or retracted from, the workpiece. The independent chuck usually has four jaws which are independently and radially moved to and from the workpiece. With both types of lathe chucks, each jaw is attached to a radially moving actuator, is rigid, is generally of a single-piece construction, and typically has a work-piece-gripping surface shaped to generally match the workpiece.

Existing jaws have difficulty in securely holding imperfectly-shaped workpieces. For example, where the workpiece is a cylindrical tube, the tube stock may be within specifications, but still be bent, bowed, out of round, with wall thickness variations, or with other deviations from true cylindrical form. This creates a situation in which the standard jaws allow the workpiece to slip during machining, or if tightened to prevent slippage can actually deform the tube. Presently, the machine operator must compensate for each imperfectly-shaped tube with shims, by time-consuming trial and error, and even then is not assured that the part will be acceptable when finished. The handling of shims can be a safety hazard. Also, it is difficult using standard jaws to hold an imperfectly-shaped workpiece close to the average lengthwise center line with the ends of the tube reasonably parallel. For work demanding close tolerances, the reject percentages can be high and costly.

SUMMARY OF THE INVENTION

It is an object of the invention to securely hold an imperfectly-shaped workpiece in a lathe chuck.

It is another object of the invention to hold an imperfectly-shaped workpiece in a lathe chuck without deforming the workpiece.

It is a further object of the invention to quickly and safely hold an imperfectly-shaped workpiece in a lathe chuck.

It is also an object of the invention to hold, in a lathe chuck, an imperfectly-shaped workpiece to the average lengthwise center line.

It is an added object of the invention to hold an imperfectly-shaped workpiece in a lathe chuck, with the ends of the workpiece generally parallel.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the lathe chuck jaw may comprise a base part and shoe part. The base part is radially adjustable across the chuck's face. The shoe part is rotatably connected to the base part allowing the shoe part's workpiece-conforming surface to engage the workpiece and to tilt so as to generally match the orientation of the workpiece's perfect or imperfectly-shaped surface.

Several benefits and advantages are derived from the invention. The lathe chuck jaw's rotatable shoe part can quickly and securely hold even an imperfectly-shaped workpiece without deformation. The swivel action self-aligns the workpiece holding it to an average lengthwise center line with its ends generally parallel. The invention allows an imperfectly-shaped workpiece to be safely held without the use of shims.

BRIEF DESCRIPTION OF THE DRAWINGS

The accompanying drawings which are incorporated in and form a part of this specification, illustrate an embodiment of the present invention and, together with a description, serve to explain the principles of the invention. In the drawings.

DETAILED DESCRIPTION OF THE INVENTION

Reference will now be made in detail to the present preferred embodiment of the invention, an example of which is illustrated in the accompanying drawings.

Figure 1:
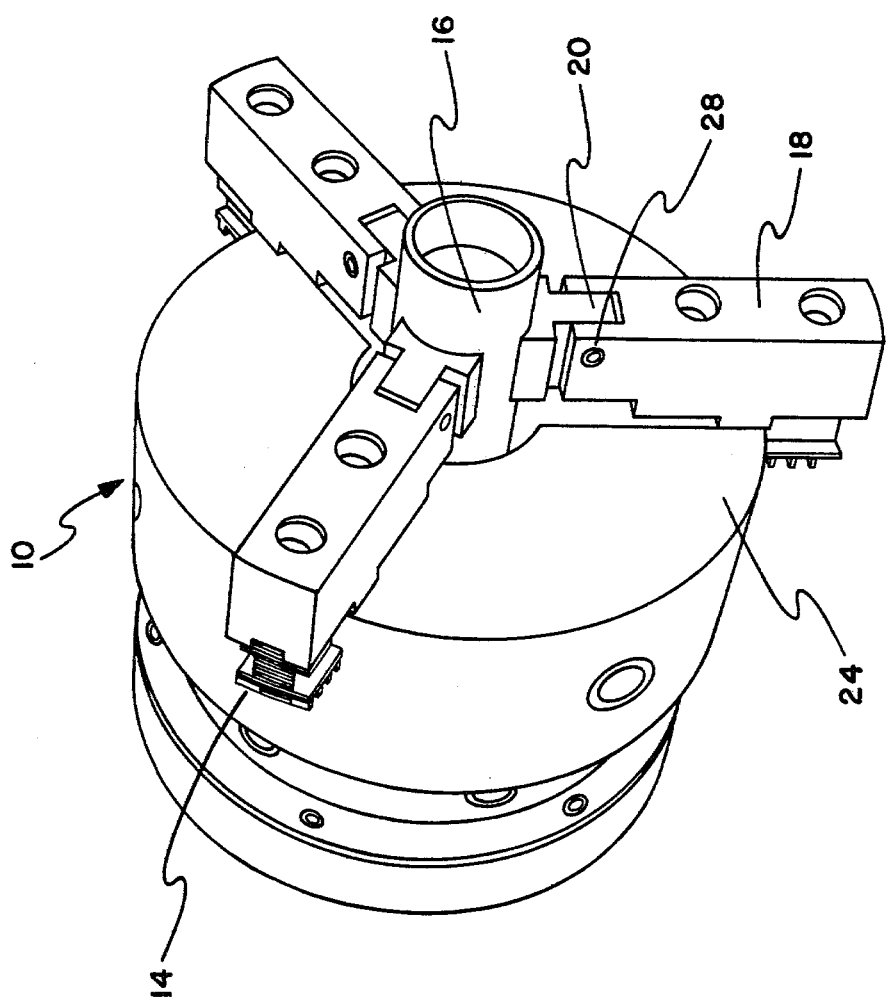
FIG. 1 is a perspective view of a lathe chuck showing a workpiece held by three lathe chuck jaws of the invention.
Figure 3:
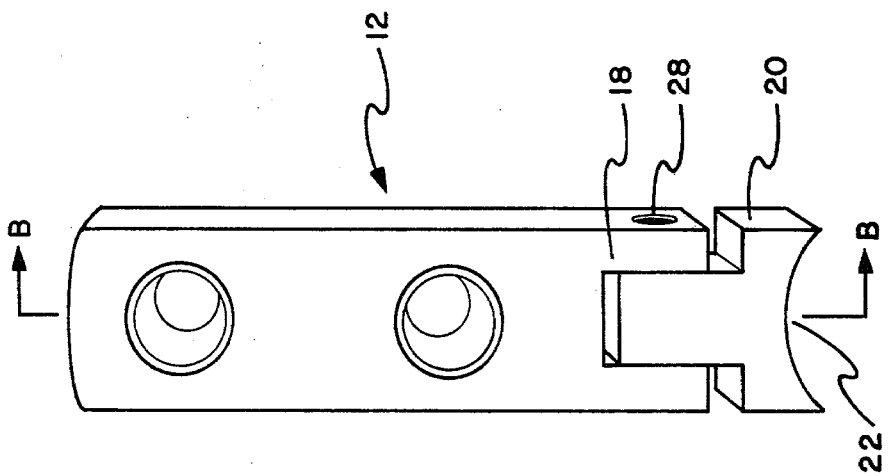
FIG. 3 is a generally front view of the lathe chuck jaws of FIG. 2.
Figure 2:
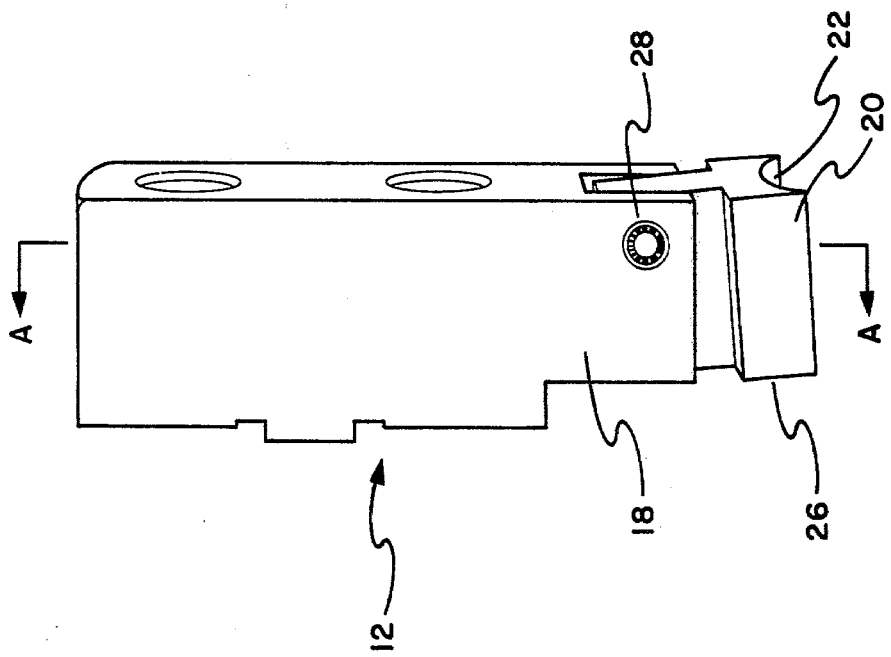
FIG. 2 is a generally side view of one of the lathe chuck jaws of FIG. 1.
Figure 5:
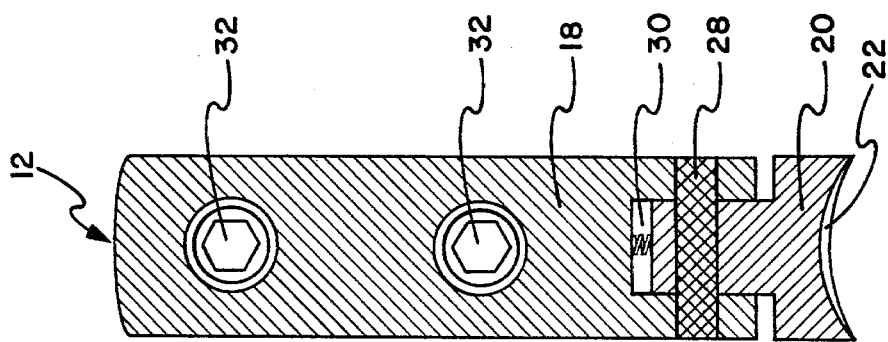
FIG. 5 is a sectional view of FIG. 2 taken along arrows AA, with mounting bolts included.
Figure 4:
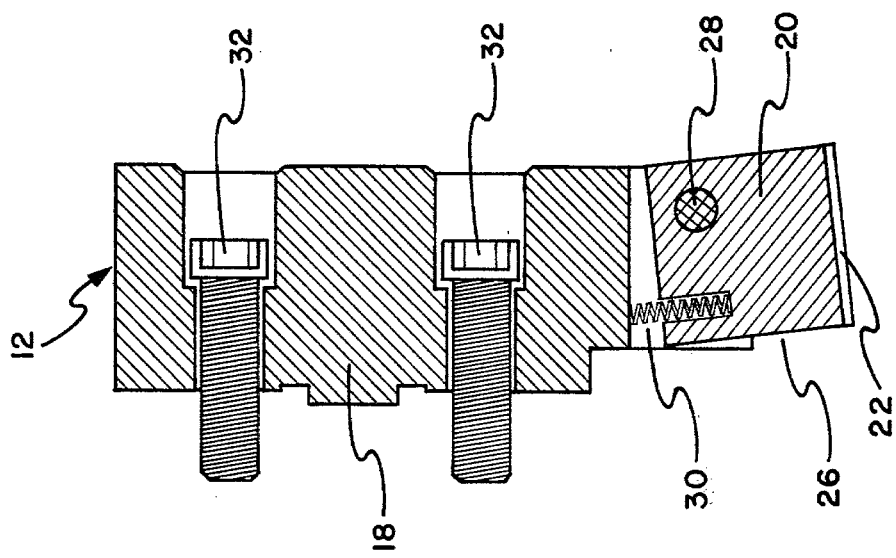
FIG. 4 is a sectional view of FIG. 3 taken along arrows BB, with mounting bolts included.

FIG. 1 shows a lathe chuck 10, of the universal chuck type, utilizing 3 lathe chuck jaws. Each jaw has a base part 18 and a shoe part 20. Each base part 18 is rigidly attached to a radially moving actuator 14. Each shoe part 20 is rotatably attached to its corresponding base part 18 by means of a pivot pin 28. Other rotatably attaching means would include a ball and socket joint, such as having the base part 18 shaped as the socket and the shoe part 20 shaped as the ball. This would allow 3 degrees of rotation of the shoe part 20 with respect to the base part 18. The pivot pin 28 shown in FIG. 1 restricts the rotable attachment to a pivotable attachment allowing 1 degree of rotation, which is about the axis of the pivot pin 28. The actuator 14 radially adjusts or moves the base part 18, and hence the pivotably attached shoe part 20, across the chuck's face 24 in to and out from the workpiece 16. In FIG. 1, the workpiece 16 is a cylindrical tube. However, solid or annular workpieces, which are of square, hexagonal, or other shapes, could be held in a universal, independent, or other type of lathe chuck using the invention.

A single lathe chuck jaw 12 including its base part 18 and shoe part 20 is shown in greater detail in FIGS. 2 through 5. The base part 18 is rigidly attached to the actuator 14 using two allen head mounting bolts 32.

The shoe part 20 has a workpiece-conforming surface 22. For the cylindrical tube workpiece 16 of FIG. 1, the workpiece-conforming surface 22 of the shoe part 20 is curved to match the workpiece's cylindrical surface. The workpiece-conforming surface 22 would be suitably shaped to match a square, hexagonal or other shaped workpiece.

The pivot pin 28 is shown located generally perpendicular to the longitudinal axis of the lathe chuck 10 as well as generally perpendicular to a direction, or transverse axis, defined by the lathe chuck jaw base part's 18 radial motion, or adjustment, supplied by the actuator 14. This allows the shoe part 20 to assume an angular orientation about the pivot pin 28 which generally matches the local surface orientation of the workpiece 16. The workpiece 16 may be within specifications as stock, but still have a bend, curve or other surface irregularity which the pivoting shoe part 20 can locally match for a more secure grip or hold.

The pivot pin 28 could be located at any longitudinal distance from the chuck's face 24 although it is preferred, as shown in the drawings, that the pivot pin 28, which defines the pivotal axis, be located longitudinally further away from the chuck's face 24 than is the shoe part's centroid or center of mass.

A biasing means is used to resiliently tilt the workpiece-conforming surface 22, about the pivot pin 28, away from the chuck's face 24. The biasing means could include a spring, and as shown in the drawings, a compression spring 30 is preferred. The compression spring 30 tilts the workpiece-conforming surface 22 such that when the actuator 14 radially moves or adjusts the jaw 12 to contact or grip the workpiece 16, the workpiece-conforming surface 22 engages the workpiece 16 first along a portion of the surface 22 generally adjacent the chuck-face-fronting surface 26 of the shoe part 20. This surface portion is closest to the chuck face 24. Continued radial inward movement of the jaw 12, together with the rotating action of the shoe part 20 and the resilience of the spring 30, causes the workpiece 16 to be longitudinally drawn into the lathe chuck 10 by the surface 22. A standard self-centering stop (which is simply an annular ring tapered in a cone shape) could be used to hold the other end of the workpiece 16 within the lathe. The action of the jaws 12 self aligns or self centers the workpiece 16 keeping the ends of the workpiece 16 generally parallel and holding the workpiece 16 generally to an average center line along the longitudinal axis. The compression spring 30, to help accomplish this, is placed in a matching hole in a superficies or surface, of the shoe part 20, which is generally opposite the workpiece-conforming surface 22. The hole is generally perpendicular to this opposing surface. The spring 30 has a length and a stiffness sufficient to provide the desired tilt and drawing-in action. The spring 30 is disposed longitudinally closer to the chuck's face 24 than is the pivot pin 28. In compression, the spring 30 also contacts the base part 18.

The preferred pivotal attaching means, as shown in the drawings, includes the base part 18 having a yoke shape forming a longitudinal groove, with the shoe part 20 having a tongue shape which pivotly matches the groove. The pivot pin 28 is placed in a single bore formed by transverse holes in the tongue and yoke. There is sufficient clearance between the shoe part 20 and the base part 18 so that the shoe part 20 can rotate about the pivot pin 28 such that the workpiece-conforming surface 22 can rotate both towards and away from the chuck's face 24. The design limits for the rotation are determined from the acceptable imperfections in the shape of the stock workpiece 16.

The shoe part 20 can include an allen set screw disposed between the pivot pin 28 and the compression spring 30 along an axis perpendicular to both the longitudinal axis and the transverse axis previously mentioned. The allen set screw can be used to stop the rotation of the shoe part 20 with respect to the base part 18 and would preferably only be used to help cut the shape of the workpiece-conforming surface 22 to fit an expected workpiece 16 before actual work would begin.

It is possible to use only a single jaw 12 of the invention along with standard jaws in a lathe chuck, but it is preferable that each jaw of the lathe chuck be the jaw of the invention. In operation, with a universal chuck using 3 jaws of the invention and a standard self-centering stop, one would proceed as follows. A tube or like workpiece would be put in the lathe and moved against the standard self-centering stop. Using the chuck key, the lathe chuck jaws 12 would be made to close radially inward on the workpiece 16. As the shoe part 20 nears the workpiece 16, it will be seen that the workpiece-conforming surface 22 contacts the workpiece 16 first near the chuck's face 24. As the jaws 12 continue to be radially moved to clamp the workpiece 16, it will be seen that the shoe part 20 both rotates and moves radially inward drawing the workpiece 16 into the lathe against the standard self-centering stop, insuring a secure grip. With a workpiece 16 having an imperfect surface, such as one that is bent, it will be seen that the shoe part 20 is tilted to match the orientation of the workpiece 16 at the point the jaw 12 contacts the workpiece 16. To release the workpiece 16, the above process is reversed.

In summary, by using a lathe chuck jaw 12 having a base part 18 and a shoe part 20, with the base part 18 radially adjustable across the chuck's face 24 and the shoe part 20 rotatably attached to the base part 18 and having a generally workpiece-conforming surface 22, the lathe chuck jaw 12 will engage the workpiece 16 and generally match its orientation, including that of an imperfectly shaped workpiece.

The foregoing description of a preferred embodiment of the invention has been presented for purposes of illustration and description. It is not intended to be exhaustive or to limit the invention in the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A jaw, for use in a lathe chuck having a longitudinal axis of the type wherein the jaws are radially adjustable across the chuck's face to grip a workpiece, comprising:
   (a) A jaw base radially adjustable across said face;
   (b) a jaw shoe having a generally workpiece-conforming surface engageable with, and generally orientationally matchable with, said workpiece;

(c) means for rotatably attaching said shoe to said base comprising a pivot pin generally perpendicular to the longitudinal axis of said lathe chuck and generally perpendicular to the direction of adjustment of said base and disposed further from said face than is the centroid of said shoe, wherein said base has a yoke and said shoe has a matching tongue, with said tongue and said yoke also having transverse holes which, when said tongue is disposed in said yoke, form a single bore which contains said pivot pin; and (d) further comprising biasing means for resiliently tilting said surface comprising a compression spring, with said shoe having a superficies, generally opposite said surface, containing a cavity generally perpendicular to said surface and disposed closer to said face than is said pivot pin, and with said spring disposed in said cavity and contacting said base to resiliently tilt said surface so that, when said jaw is adjusted to grip said workpiece, the portion of said surface closest to said face engages said workpiece first and said surface draws said workpiece into said lathe chuck.

* * * * *